United States Patent
Matsuno et al.

(10) Patent No.: US 9,156,367 B2
(45) Date of Patent: Oct. 13, 2015

(54) OVERRIDING DELAYED ELECTRIC VEHICLE CHARGING EVENTS

(71) Applicant: CHARGEPOINT, INC., Campbell, CA (US)

(72) Inventors: Craig Matsuno, San Jose, CA (US); Shantanu R. Kothavale, Cupertino, CA (US)

(73) Assignee: CHARGEPOINT, INC., Campbell, CA (US)

( * ) Notice: Subject to any disclaimer, the term of this patent is extended or adjusted under 35 U.S.C. 154(b) by 380 days.

(21) Appl. No.: 13/646,727

(22) Filed: Oct. 7, 2012

(65) Prior Publication Data

US 2013/0088199 A1    Apr. 11, 2013

Related U.S. Application Data

(60) Provisional application No. 61/545,087, filed on Oct. 7, 2011.

(51) Int. Cl.
*H02J 7/00* (2006.01)
*B60L 11/18* (2006.01)
*H02J 7/04* (2006.01)

(52) U.S. Cl.
CPC ......... *B60L 11/1846* (2013.01); *B60L 11/1838* (2013.01); *H02J 7/0027* (2013.01); *H02J 7/041* (2013.01); *B60L 2230/00* (2013.01); *Y02T 10/7005* (2013.01); *Y02T 10/7055* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ... Y02T 10/0788; Y02T 90/128; Y02T 90/12; B60L 2240/72
USPC .......................................................... 320/109
See application file for complete search history.

(56) References Cited

U.S. PATENT DOCUMENTS

| | | | |
|---|---|---|---|
| 6,527,176 B2 | 3/2003 | Baric | |
| 7,984,852 B2 | 7/2011 | Outwater | |
| 8,025,526 B1 | 9/2011 | Tormey et al. | |
| 2009/0079388 A1* | 3/2009 | Reddy | ........................... 320/109 |

(Continued)

OTHER PUBLICATIONS

PCT Search Report for PCT/US2012/059256, mailed Jan. 4, 2013, 11 pages.

*Primary Examiner* — Jack Chiang
*Assistant Examiner* — Brandon Bowers
(74) *Attorney, Agent, or Firm* — Nicholson De Vos Webster & Elliott LLP

(57) ABSTRACT

An electric vehicle charging station that supports delayed charging overrides. In one embodiment, to support delayed charging override in an electric vehicle charging station that requires authorization, after authentication is successful (e.g., the electric vehicle operator is authorized) and the electric vehicle is detected (e.g., the charging cord has been plugged into the charging port of the electric vehicle), the charging station begins a plug out timer for the electric vehicle operator to unplug the charging cord from the charging port of the electric vehicle and then begins a plug-in timer for the electric vehicle operator to plug the charging cord back into the charging port of the electric vehicle. If the electric vehicle operator does so within the periods of the timers, the charging session will not end and the delayed charging will be overridden.

18 Claims, 3 Drawing Sheets

(56) References Cited

U.S. PATENT DOCUMENTS

| | | | |
|---|---|---|---|
| 2010/0174667 A1* | 7/2010 | Vitale et al. | 705/412 |
| 2011/0175569 A1 | 7/2011 | Austin | |
| 2012/0265362 A1* | 10/2012 | Yasko | 700/297 |
| 2014/0117946 A1* | 5/2014 | Muller et al. | 320/162 |

* cited by examiner

OVERRIDING DELAYED ELECTRIC VEHICLE CHARGING EVENTS

CROSS-REFERENCE TO RELATED APPLICATIONS

This application claims the benefit of U.S. Provisional Application No. 61/545,087, filed Oct. 7, 2011, which is hereby incorporated by reference.

FIELD

Embodiments of the invention relate to the field of electric vehicle charging; and more specifically, to overriding delayed electric vehicle charging events.

BACKGROUND

Electric vehicle charging stations (hereinafter "charging stations") are used to charge electric vehicles (e.g., electric battery powered vehicles, gasoline/electric battery powered vehicle hybrids, etc.). Charging stations may be located in designated charging locations (e.g., similar to a gas station), near parking spaces (e.g., public parking spaces and/or private parking space), at private residences, etc. Charging stations may be controlled (e.g., owned or leased) by governments, businesses, utilities, organizations, or other entities.

Some electric vehicles have a feature that allows the electric vehicle operators to choose to configure charging immediately or delayed (e.g., based on departure time, based on electric rates and departure time). Delayed charging allows the load to be distributed. Some electric vehicles also have a way to override a delayed charging configuration at the time of charging. One example of temporarily overriding a delayed charging configuration is to unplug the charging cord from the charging port of the electric vehicle and then plug it back in within a certain amount of time (e.g., 5 seconds). This will cause the delayed charging configuration to be overridden and charging to begin immediately.

SUMMARY

In one embodiment, to support delayed charging override in an electric vehicle charging station that requires authorization, after authentication is successful (e.g., the electric vehicle operator is authorized) and the electric vehicle is detected (e.g., the charging cord has been plugged into the charging port of the electric vehicle), the charging station begins a plug out timer for the electric vehicle operator to unplug the charging cord from the charging port of the electric vehicle and then begins a plug-in timer for the electric vehicle operator to plug the charging cord back into the charging port of the electric vehicle. If the electric vehicle operator does so within the periods of the timers, the charging session will not end and the delayed charging will be overridden.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
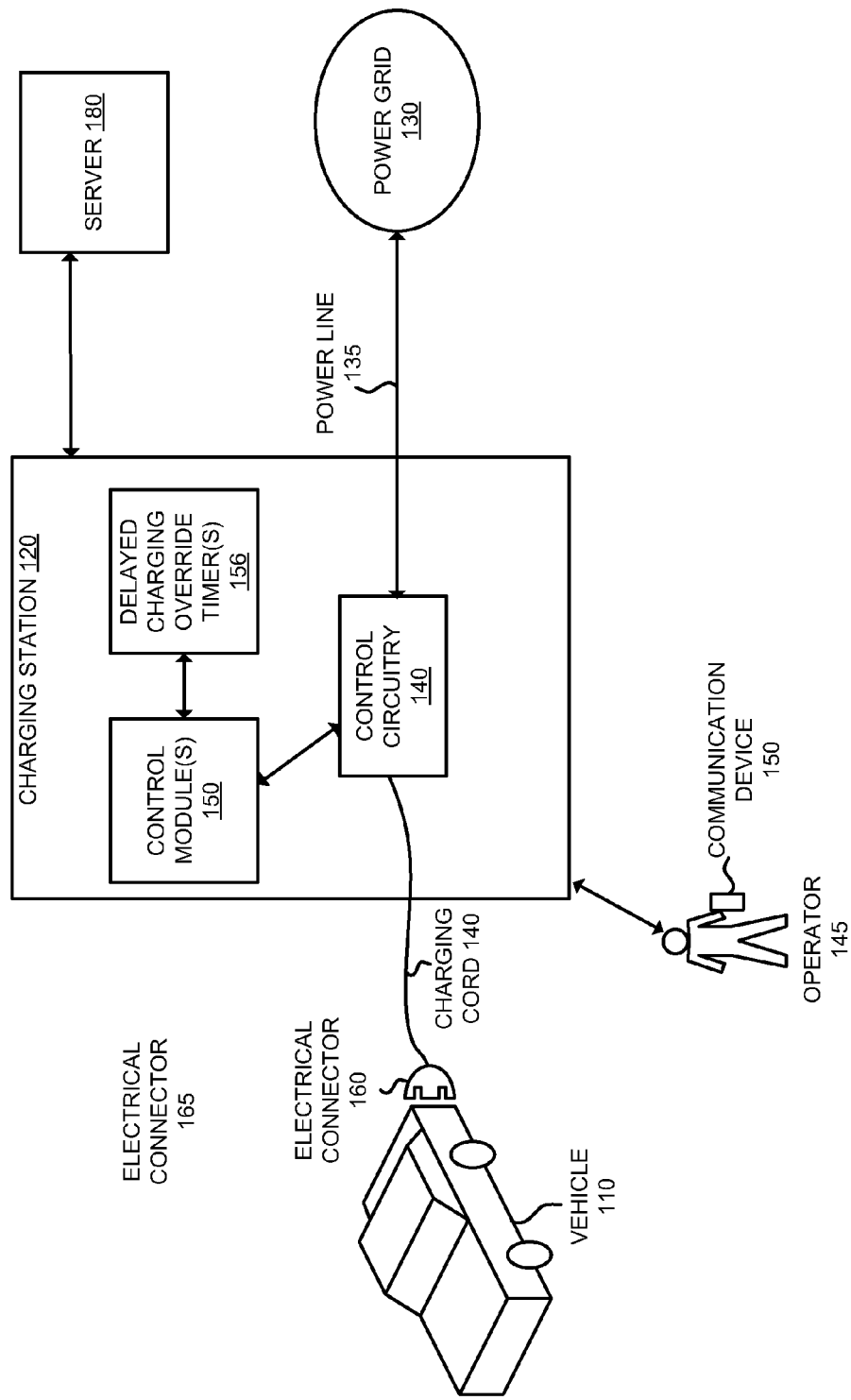
FIG. 1 illustrates a system for overriding delayed charging events according to one embodiment.

FIG. 1 illustrates a system for overriding delayed charging events according to one embodiment. The charging system illustrated in FIG. 1 includes the electric vehicle charging station 120 (hereinafter referred to as the "charging station 120"), which is coupled with the power grid 130 over the power line 135. The power grid 130 may be owned and/or operated by local utility companies or owned and/or operated by private persons/companies. The charging station 120 may also be coupled with the charging network server 180 indirectly or directly over a Wide Access Network (WAN) connection (e.g., Cellular, WiFi, Plain Old Telephone Service modem, leased line, etc.).

The charging station 120 controls the application of energy from the power grid 130 to electric vehicles. For example, the control circuitry 140 controls the energizing of the charging station (allows energy to flow from the power grid to an electric vehicle). Operators of electric vehicles use the charging station 120 to charge their electric vehicles. Thus, the electricity storage devices (e.g., batteries, supercapacitors, etc.) of electric vehicles (e.g., electric powered vehicles, gasoline/electric powered vehicle hybrids, etc.) may be charged through use of the charging station 120.

In one embodiment, only authorized vehicle operators (those authorized to use the charging station 120) are permitted to use the charging station. The electric vehicle operator 145 may use the communication device 150 to initiate and request a charging session for the electric vehicle 110. The communication device 150 may be a WLAN or WPAN device (e.g., one or two-way radio-frequency identification (RFID) device, mobile computing device (e.g., laptops, palmtop, smartphone, multimedia mobile phone, cellular phone, etc.), ZigBee device, etc). The communication device 150 communicates unique operator-specific information (e.g., operator identification information, etc.) to the charging station 120 (either directly or indirectly through the server 180). For example, in case the communication device 150 is an RFID device, the operator 145 presents the communication device 150 to the charging station 120 to request a charging session for the vehicle 110.

Based on the information communicated by the communication device 150, a determination is made whether the operator 145 is authorized to use the charging station 120. In one embodiment of the invention, the charging station 120 locally determines whether the operator 145 is authorized (e.g., by checking whether the operator 145 is represented on a list of authorized users stored in the charging station 120). In another embodiment of the invention, the charging station 120 may transmit an authorization request that includes the information read from the communication device 150 to the server 180 for authorization. In another embodiment of the invention, the server 180 receives the charging session request from the operator 145 directly and determines whether the operator 145 is authorized. In any of these embodiments, if the operator 145 is authorized, the charging station 120 will be energized.

It should be understood that the operator 145 may request a charging session from the charging station 120 differently in some embodiments of the invention. For example, the operator 145 may interact with a payment station coupled with the charging station 120, which may then send appropriate instructions to the charging station 120 regarding the charging of the vehicle 110 (e.g., instructions to energize, etc.). The payment station may function similarly to a payment station for a parking space. In addition, the payment station coupled with the charging station may be used both for parking payment and charging payment.

After the operator 145 has been authorized, the charging station 120 determines whether the electric vehicle 110 has been detected. For example, the charging station 120 determines whether the electrical connector 160 of the charging cord 140 has been plugged into onboard charging circuitry of the electric vehicle 110. For example, if the J1772 standard is used, the charging station 120 may determine whether the electrical connector 160 is plugged into onboard charging circuitry of the electric vehicle 110 responsive to determining that the voltage on a control pilot circuit is of a certain amount (e.g., 12 volts).

Some electric vehicles allow for their operators to configure them to operate in delayed charging mode, where charging does not commence immediately. For purposes of explanation, assume that the vehicle 110 is configured to operate in delayed charging mode. In such a mode, the vehicle 110 does not begin to charge immediately even after authorized and connected to the charging station. Some electric vehicles also have a way for the operators to temporarily override delayed charging. For example, to temporarily override a delayed charging event, the operator 145 unplugs the charging connector 160 from the onboard charging circuitry of the electric vehicle 110 and then plugs it back in within a certain amount of time (e.g., 5 seconds).

However, unplugging the charging connector 160 from the onboard charging circuitry of the electric vehicle 110 may cause the charging station 120 to terminate the charging session (because the charging station 120 believes that the intention of the electric vehicle operator is to terminate the charging session when unplugging the electrical connector 160). Since the charging session is terminated, the electric vehicle operator may have to re-authorize in order to use the charging station 120 and the delayed charging override may not work.

To overcome this problem, from the time that the charging station 120 has determined to allow charging of an electric vehicle (the operator has been authorized and the vehicle is detected), the charging station 120 allows X amount of time (e.g., 10 seconds) for the operator 145 to unplug the connector 160 from the vehicle 110, and if removed during that time, another Y amount of time (e.g., 10 seconds) for the operator 145 to plug the connector 160 back in. If this is done, the charging session will not be terminated (the operator will not have to re-authorize) and the delayed charging mode will be overridden. For example, the control module(s) 150 manage the delayed charging override timer(s) 156, which may include a configurable plug-out timer and a configurable plug-in timer, to permit the electric vehicle operator to override a delayed charging event by unplugging the connector 160 from the vehicle and shortly thereafter plugging that connector 160 back into the vehicle.

Figure 2:
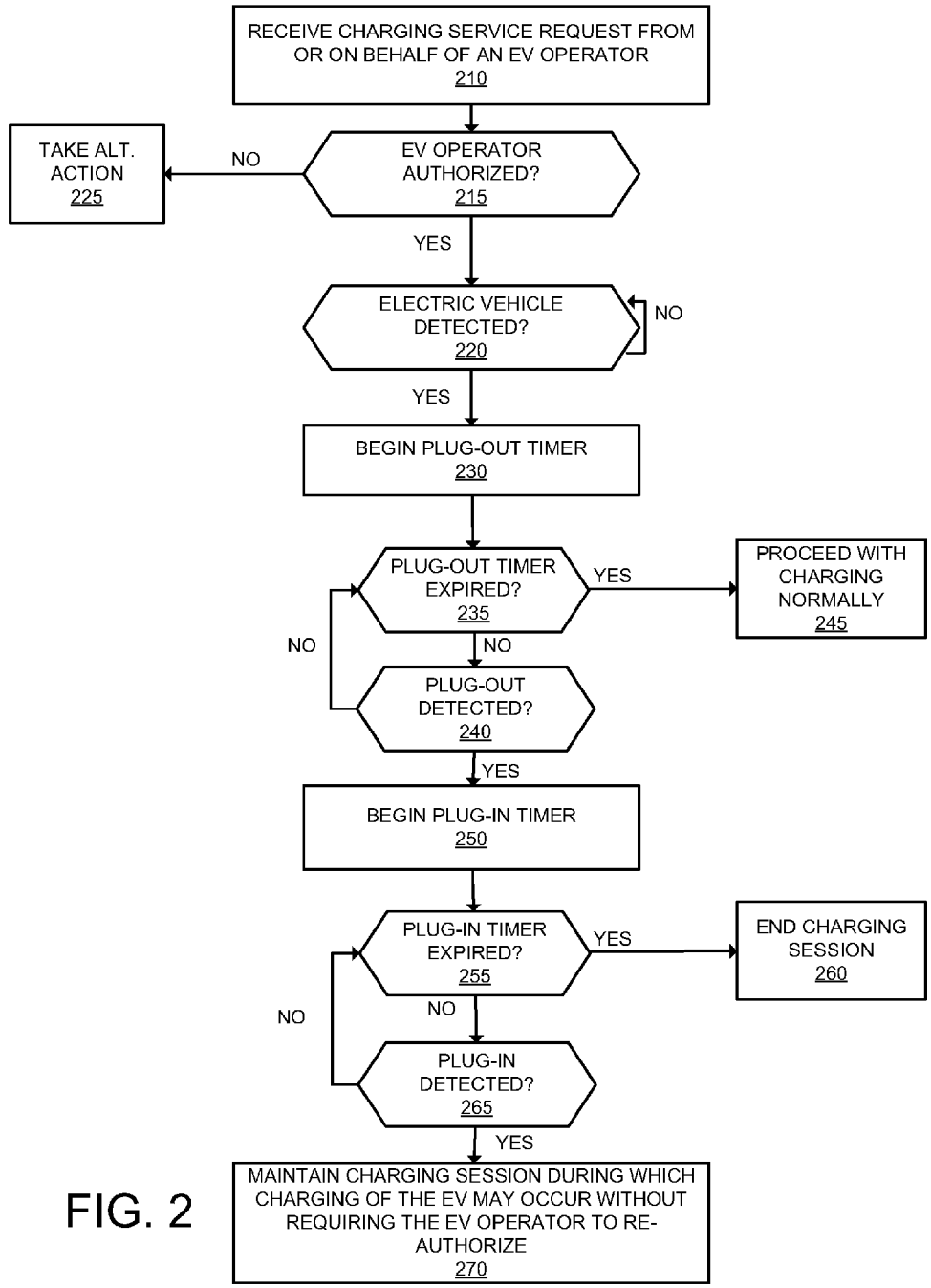
FIG. 2 is a flow chart illustrating exemplary operations for supporting delay charging override in a charging station according to one embodiment.

FIG. 2 is a flow chart illustrating exemplary operations for supporting delay charging override in a charging station according to one embodiment. The operations of FIG. 2 will be described with reference to the exemplary embodiment of FIG. 1. However, it should be understood that the operations of FIG. 2 can be performed by embodiments other than those discussed with reference to FIG. 1, and the embodiments discussed with reference to FIG. 1 can perform operations different than those discussed with reference to FIG. 2.

At operation 210, the charging station 120 receives a request for charging service from, or on behalf of, the electric vehicle operator 145. For example, the request may be received via the use of the communication device 150 from the operator 145. The request includes operator-specific information (e.g., an identifier associated with the operator).

Flow then moves to operation 215, and a determination is made whether the operator 145 is authorized to use the charging station 120. In one embodiment, the charging station 120 locally determines whether the operator 145 is authorized (e.g., the control module(s) may access a list of authorized users stored in the charging station 120 to determine whether the identifier of the operator 145 is represented). In another embodiment of the invention, the charging station 120 may transmit an authorization request that includes the operator-specific information (or a subset of the information) to the server 180 for authorization. In another embodiment of the invention, the server 180 receives the charging service request from the operator 145 directly and determines whether the operator 145 is authorized. If the electric vehicle operator is not authorized, then flow moves to operation 225 and alternative action is taken and charging does not commence (e.g., a message is displayed that indicates that the operator is not authorized). If the electric vehicle operator is authorized, then flow moves to operation 220.

At operation 220, the charging station 120 determines whether an electric vehicle is detected. For example, the charging station 120 determines whether the electrical connector 160 of the charging cord 140 has been plugged into onboard charging circuitry of the electric vehicle 110. For example, if the J1772 standard is used, the charging station 120 may determine whether the electrical connector 160 is plugged into onboard charging circuitry of the electric vehicle 110 responsive to determining that the voltage on a control pilot circuit is of a certain amount (e.g., 12 volts). The charging station 120 waits (at least for a certain amount of time) for the electric vehicle to be detected. When the electric vehicle is connected, then flow moves to operation 230.

At operation 230, the charging station 120 begins a plug-out timer. The plug-out timer may be configurable by system administrators and/or the charging station owner. If the plug-out timer expires prior to the electrical connector 160 being removed from the onboard circuitry of the electric vehicle 110, then flow moves from operation 235 to operation 245 and charging proceeds normally (the charging may proceed according to a delayed charging event if configured, or may commence immediately if configured). If, however, the plug-out timer has not expired (flow moves from operation 235 to operation 240) and the charging station 120 detects that the connector 160 has been unplugged from the onboard circuitry of the electric vehicle 110, then flow moves from operation 240 to operation 250. It should be understood that if the charging station 120 detects that the connector 160 has been removed after the plug-out timer has expired, then the charging station 120 will terminate the charging session.

In one embodiment, the plug-out timer is started soon after (e.g., within a few seconds) the charging station 120 determines that it is willing to charge (the operator is authorized and the vehicle is connected). In other embodiments where vehicles are able to uniquely identify themselves to the charging station, the plug-out timer may not be necessary. In such embodiments, after detecting that the connector has been unplugged from the vehicle, the plug-in timer is started and if the connector is plugged back into the vehicle (the same vehicle), then the charging will proceed with the delayed charging event being overridden.

At operation 250, the charging station 120 begins a plug-in timer. The plug-in timer may be configurable by system administrators and/or the charging station owner. If the plug-in timer expires prior to the electrical connector 160 being plugged into the onboard charging circuitry of the electric vehicle 110, then flow moves from operation 255 to operation 260 where the charging session is terminated. If, however, the plug-in timer has not expired (flow moves from operation 255 to operation 265) and the charging station 120 detects that the connector 160 has been plugged into the onboard circuitry of the electric vehicle 110, then flow moves to operation 270.

At operation 270, the charging session is maintained during which charging of the electric vehicle may occur (typically charging of the electricity storage device of the electric vehicle 110 will commence shortly thereafter), and the electric vehicle operator does not have to re-authorize in order to use the charging station.

In one embodiment, the owner of a charging station may configure whether the delayed charging event override feature is enabled on the charging station. In one embodiment, the owner of a charging station may configure whether the delayed charging event override feature is enabled for electric vehicle operators (e.g., the charging station owner may configure the station such that some electric vehicle operators are permitted to override a delayed charging event while other operators are not.

Figure 3:
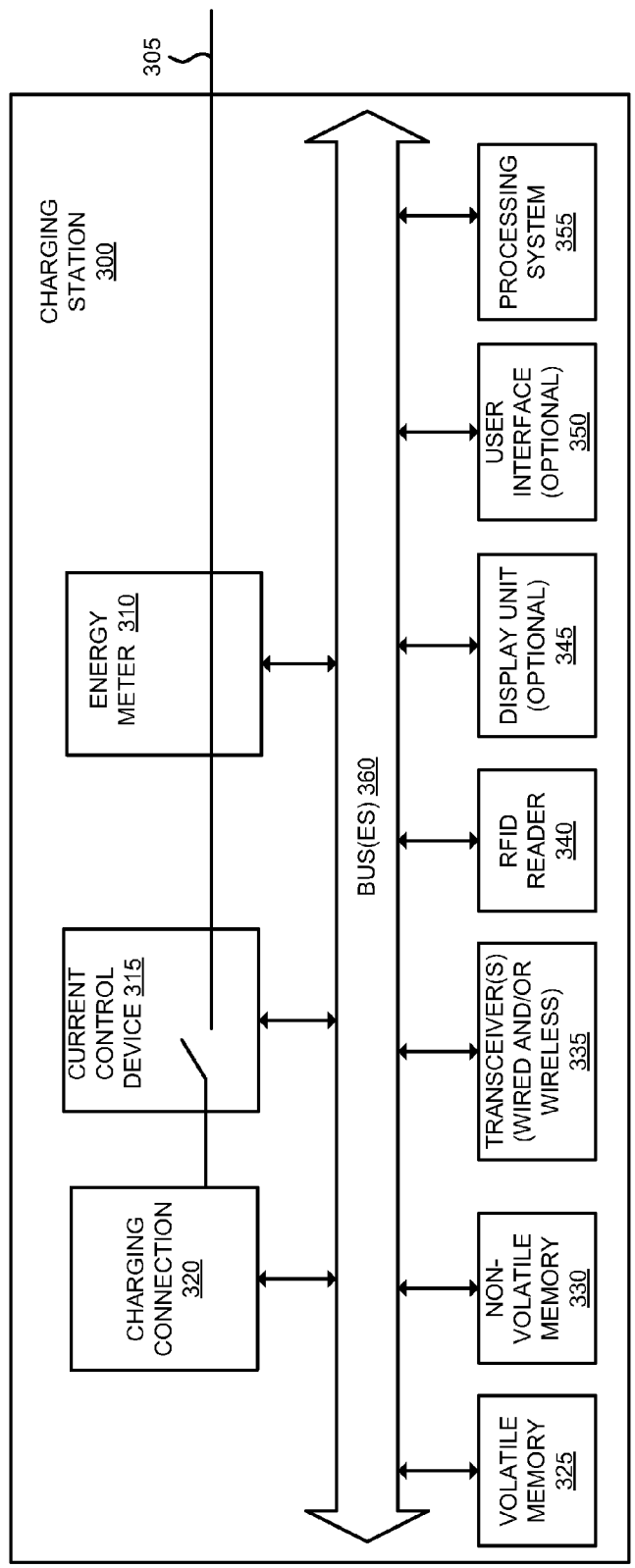
FIG. 3 illustrates an exemplary embodiment of a charging station according to one embodiment of the invention.

FIG. 3 illustrates an exemplary embodiment of a charging station according to one embodiment of the invention. It should be understood that FIG. 3 illustrates an exemplary architecture of a charging station, and other, different architectures may be used in embodiments of the invention described herein. For example, one or more of the components illustrated in FIG. 3 may not be included in some embodiments.

As illustrated in FIG. 3, the charging station 300 includes the energy meter 310, the current control device 315, the charging connection 320, the volatile memory 325, the non-volatile memory 330 (e.g., hard drive, flash, PCM, etc.), one or more transceiver(s) 335 (e.g., wired transceiver(s) such as Ethernet, power line communication (PLC), etc., and/or wireless transceiver(s) such as 802.15.4 transceivers (e.g., Zig-Bee, etc.), Bluetooth, WiFi, Infrared, GPRS/GSM, CDMA, etc.), the RFID reader 340, the display unit 345, the user interface 350, and the processing system 355 (e.g., one or more microprocessors and/or a system on an integrated circuit), which are coupled with one or more buses 360.

The energy meter 310 measures the amount of electricity that is flowing on the power line 305 through the charging connection 320. While in one embodiment of the invention the energy meter 310 measures current flow, in an alternative embodiment of the invention the energy meter 310 measures power draw. The energy meter 310 may be an induction coil or other devices suitable for measuring electricity. In some embodiments, the energy meter 310 is a programmable time of use energy meter (e.g., programmed according to the prices and time periods defined by its host).

The charging connection 320 is a power receptacle or circuitry for an attached charging cord (e.g., with a SAE J1772 connector). The power receptacle can be any number of types of receptacles such as receptacles conforming to the NEMA (National Electrical Manufacturers Association) standards 5-1 5, 5-20, and 14-50 or other standards (e.g., BS 1363, CEE7, etc.) and may be operating at different voltages (e.g., 120V, 240V, 230V, etc.).

The current control device 315 is a solid-state device that is used to control the current flowing on the power line 305 or any other device suitable for controlling the current flowing on the power line 305. For example, in some embodiments the current control device 315 energizes the charging connection 320 (e.g., by completing the circuit to the power line 305) or de-energizes the charging connection 320 (e.g., by breaking the circuit to the power line 305). In some embodiments the current control device 315 energizes the charging connection 320 responsive to receiving an authorized request from an electric vehicle operator.

The RFID reader 340 reads RFID tags from RFID enabled devices (e.g., smartcards, key fobs, contactless credit cards, etc.), embedded with RFID tag(s) of operators that want to use the charging station 300. For example, in some embodiments a vehicle operator can wave/swipe an RFID enabled device near the RFID reader 330 to request a charging session with the charging station 300. It should be understood, however, that charging sessions may be requested in different ways and access identifiers may be presented to the charging station in different ways. For example, in some embodiments the electric vehicles communicate an access identifier (e.g., their VIN) to the charging station through a protocol (e.g., PLC). In such embodiments, the electric vehicle operator may not be required to present an access identifier (such as the RFID enabled device) to gain access to the charging station.

The transceiver(s) 335 transmit and receive messages. For example, the transceiver(s) 335 transmit authorization requests to the server, receive authorization replies from the server, transmit charging session data to the server for accounting, etc. The display unit 345 is used to display messages to vehicle operators including the price(s) for charging service, current cost for charging service, charging status, confirmation messages, error messages, notification messages, etc. The display unit 345 may also display parking information if the charging station 300 is also acting as a parking meter (e.g., amount of time remaining in minutes, parking violation, etc.).

The user interface 340 (which is optional) allows users to interact with the charging station 300. By way of example, the user interface 350 allows electric vehicle operators to request charging sessions, pay for charging sessions, enter in account and/or payment information, etc.

The processing system 355 may retrieve instruction(s) from the volatile memory 325 and/or the nonvolatile memory 330, and execute the instructions to perform operations as described above.

While a specific type of override has been described herein (a delayed charging event override), other overrides are within the scope of the invention. For example, parameters that can be overridden include a negotiated charge cycle between the charging station and the electric vehicle, the level of charging, the type of charging, and/or the price of charging (e.g., the electric vehicle operator may have accepted a certain charging "duty cycle" based on prices/tariffs choices that were displayed to him but wants to change to a default duty cycle). These overrides may be performed by unplugging the connector from the electric vehicle and shortly thereafter reconnecting the connector to the electric vehicle, and similar timers as described herein may be used. In other cases, these overrides may be requested using a mobile application or through a web page. In any case, if the override is successful, the charging session remains alive (it is not terminated and the operator does not need to re-authorize).

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., servers, client devices, charging stations). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in an electric vehicle charging station to support delayed charging override, comprising:
   receiving a request for charging service from an electric vehicle operator, wherein the request for charging service includes an identifier;
   determining, based at least in part on the identifier, that the electric vehicle operator is authorized to use the electric vehicle charging station; and
   responsive to detecting that an electric vehicle has been connected to the electric vehicle charging station, performing the following:
   starting a plug-out timer,
   responsive to determining that the electric vehicle has been disconnected prior to the plug-out timer expiring, starting a plug-in timer, and
   responsive to determining that the electric vehicle has been connected to the electric vehicle charging station prior to the plug-in timer expiring, maintaining a charging session during which charging of the electric vehicle may occur, without requiring the electric vehicle operator to re-authorize.

2. The method of claim 1, wherein determining that the electric vehicle has been connected to the electric vehicle charging station includes determining that voltage on a pilot circuit is a predefined amount.

3. The method of claim 2, wherein determining that the electric vehicle has been disconnected from the electric vehicle charging station includes determining that the voltage on the pilot circuit is not the predefined amount.

4. The method of claim 1, wherein a value of the plug-out timer is configured by a system administrator or an owner of the electric vehicle charging station.

5. The method of claim 1, wherein a value of the plug-in timer is configured by a system administrator or an owner of the electric vehicle charging station.

6. The method of claim 1, wherein the identifier is associated with an operator of the electric vehicle.

7. An electric vehicle charging station, comprising:
   a set of one or more processors; and
   a set of one or more non-transitory storage mediums that are coupled to the set of processors and are configured to store instructions that, when executed by the set of processors, perform the following operations:
   receive a request for charging service from an electric vehicle operator, wherein the request for charging service includes an identifier;
   determine, based at least in part on the identifier, that the electric vehicle operator is authorized to use the electric vehicle charging station; and
   responsive to a detection that an electric vehicle has been connected to the electric vehicle charging station, perform the following:
   start a plug-out timer,
   responsive to a determination that the electric vehicle has been disconnected prior to the plug-out timer expiring, start a plug-in timer, and
   responsive to a determination that the electric vehicle has been connected to the electric vehicle charging station prior to the plug-in timer expiring, maintain a charging session during which charging of the electric vehicle may occur, without requiring the electric vehicle operator to re-authorize.

8. The electric vehicle charging station of claim 7, wherein the determination that the electric vehicle has been connected to the electric vehicle charging station includes a determination that voltage on a pilot circuit is a predefined amount.

9. The electric vehicle charging station of claim 8, wherein the determination that the electric vehicle has been disconnected from the electric vehicle charging station includes a determination that the voltage on the pilot circuit is not the predefined amount.

10. The electric vehicle charging station of claim 7, wherein a value of the plug-out timer is configured by a system administrator or an owner of the electric vehicle charging station.

11. The electric vehicle charging station of claim 7, wherein a value of the plug-in timer is configured by a system administrator or an owner of the electric vehicle charging station.

12. The electric vehicle charging station of claim 7, wherein the identifier is associated with an operator of the electric vehicle.

13. A non-transitory computer-readable storage medium that provides instructions that, when executed by a processor, cause said processor to perform operations comprising:
   receiving a request for charging service from an electric vehicle operator, wherein the request for charging service includes an identifier;
   determining, based at least in part on the identifier, that the electric vehicle operator is authorized to use an electric vehicle charging station; and
   responsive to detecting that an electric vehicle has been connected to the electric vehicle charging station, performing the following:
   starting a plug-out timer,
   responsive to determining that the electric vehicle has been disconnected prior to the plug-out timer expiring, starting a plug-in timer, and
   responsive to determining that the electric vehicle has been connected to the electric vehicle charging station prior to the plug-in timer expiring, maintaining a charging session during which charging of the electric vehicle may occur, without requiring the electric vehicle operator to re-authorize.

14. The non-transitory computer-readable storage medium of claim 13, wherein determining that the electric vehicle has been connected to the electric vehicle charging station includes determining that voltage on a pilot circuit is a predefined amount.

15. The non-transitory computer-readable storage medium of claim 14, wherein determining that the electric vehicle has been disconnected from the electric vehicle charging station includes determining that the voltage on the pilot circuit is not the predefined amount.

16. The non-transitory computer-readable storage medium of claim 13, wherein a value of the plug-out timer is configured by a system administrator or an owner of the electric vehicle charging station.

17. The non-transitory computer-readable storage medium of claim 13, wherein a value of the plug-in timer is configured by a system administrator or an owner of the electric vehicle charging station.

18. The non-transitory computer-readable storage medium of claim 13, wherein the identifier is associated with an operator of the electric vehicle.

\* \* \* \* \*